United States Patent [19]

Ishizuka et al.

[11] Patent Number: 4,579,749

[45] Date of Patent: Apr. 1, 1986

[54] METHOD OF MAKING A SIMULATED GROUND MEAT ANALOG

[75] Inventors: Waichi Ishizuka; Ryoichi Aoki, both of Yokohama, Japan

[73] Assignee: Taiyo Yushi K.K., Yokohama, Japan

[21] Appl. No.: 657,512

[22] Filed: Oct. 4, 1984

[30] Foreign Application Priority Data

Oct. 4, 1983 [JP] Japan ................................. 58-185698

[51] Int. Cl.$^4$ ................................................. A23J 3/00
[52] U.S. Cl. ..................................... 426/574; 426/634; 426/652; 426/802
[58] Field of Search ............... 426/104, 615, 629, 632, 426/656, 802, 512, 634, 573, 574, 652

[56] References Cited

U.S. PATENT DOCUMENTS

| | | | |
|---|---|---|---|
| 4,016,295 | 4/1977 | Burrows et al. | 426/656 |
| 4,140,811 | 2/1979 | Ogasa et al. | 426/634 |
| 4,309,344 | 1/1982 | Walsh | 426/634 |

*Primary Examiner*—Robert Yoncoskie
*Assistant Examiner*—Marianne M. Cintins
*Attorney, Agent, or Firm*—Oblon, Fisher, Spivak, McClelland & Maier

[57] ABSTRACT

A method for producing a simulated ground meat analog from tofu is disclosed. The analog is produced by adjusting the pH value of a soy milk to range between 5.6 and 6.2; coagulating the pH adjusted soy milk to form tofu; pressing and dehydrating the tofu to obtain a solids content range between 35 and 50%; shaping the pressed tofu into a form similar to ground meat; and thereafter heating the shaped pressed tofu.

5 Claims, No Drawings

METHOD OF MAKING A SIMULATED GROUND MEAT ANALOG

BACKGROUND OF THE INVENTION

1. Field of the Invention

The present invention relates to a method of making a ground meat analog from tofu.

2. Description of the Prior Art

A process called "Extrusion Cooking Process" is known as a process for making ground meat analog from soybeans. This process comprises the following steps: preparing a mixture of defatted soybean meal, soy protein concentrate and soy protein isolate; moistening the mixture, blending the mixture at high temperature and pressure into a half molten state having a homogeneous states; and extruding semi-molten blend through an ori-fice of a die into the atmosphere of normal temperature and pressure. According to this method, the blend con-tinuously expands to permit a rapid evaporation of the water content thereof so that a porous texture resembling that of ground meat is obtained. The product is further chopped, dried, and size classified and is usually sold in the form of dried granules called as textured soy protein. In use, the above mentioned granules are moisten-ed with water and substituted for a part of the ground meat used in various foods such as humburgers, meat balls and the like. This dry textured soybean protein, however, has a dislike taste because it undergoes the heat treatment of high temperature during processing. For this reason, only a small amount of the said soybean protein can be used as a substitute for the ground meat.

SUMMARY OF THE INVENTION

Accordingly, an object of the invention is to provide a method which makes it possible to produce a food having a good flavour and a texture similar to that of ground meat analog of beef, pork, or chicken, by a partial modification of the process for producing tofu from soybean.

Other objects, features and advantages of the invention will become clear from the following description of the preferred embodiments.

DESCRIPTION OF THE PREFERRED EMBODIMENTS

Generally, the process for producing tofu comprises the following steps: (1) soaking of whole soybeans in water; (2) grinding of soaked soybeans (generation of "Go") (3) extraction of soy milk component by heating of "Go"; (4) separation of "Okara" (preparation of soy milk); (5) pre-cipitation of curd by adding coagulating agent to the soy milk; (6) preparation of tofu by gathering the coagulates in a box and extracting whey or preparation of silken tofu without extracting whey; and (7) subjecting tofu to water sinking.

The method of the invention uses the steps (1) to (4) of the above-explained tofu production process, i.e., from initial soaking of soybeans to the preparation of soy milk. Following preparation of the soy milk, the method of the invention employs the following five steps: (1) adjustment of pH value of the soy milk; (2) coagu-lation of soy milk by the addition of coagulating agent; (3) pressing and dehydration of the coagulates; (4) shaping into a form similar to ground meat; and (5) heat treatment of the shaped product. Thus, the method of the invention is distinguished from the known tofu production process by the steps of the pH adjustment, dehydration of soy milk to obtain a solid content of 35% or greater (compared to a usual solid content of 10 to 15% for tofu), shaping into a form similar to ground meat, and heat treatment of the shaped product. By combining these steps with the known tofu production process, it is possible to obtain a ground meat analog and exhibiting a hardness and chewiness similar to those of ground meat.

Needless to say, it is preferable to use as the starting material the dehulled soybeans, in order to improve the flavour of the soy milk and/or to use the soy milk controlled in order to expel the beany flavour by using a suitable special technique of deactivation of lipoidase.

In a test, the pressed tofu thus prepared and shaped into a diameter of about 3 mm was packed in a casing made of vinylidene chloride resin and having a diameter of 5 cm, tied off, and heated for 30 minutes in boiling water for the formation of the texture. Then, after cooling, maintained at 10° C. for one day. The material was then sliced to a thickness of 2 cm and the surface was trimmed and smoothed. The hardness and the cohesiveness were measured by means of a texturometer having a smooth plunger of 18 mm dia., in accordance with the method for measuring according to Japanese Agricultural Standard (JAS) of vegetable protein. As a result, the product proved to have a hardness of 2.0 Kg or higher and a cohesiveness of 0.8 or higher. According to JAS, those foodstuffs which have hardness of 1.5 Kg or higher and cohesiveness of 0.5 or higher are regarded as having appreciable chewiness. Thus, the food produced by the method of the invention exhibits sufficient chewiness and does not get out of shape and, hence, can suitably used as a substitute for ground meat.

The method of the invention will be described in more detail hereinunder.

The method of the invention uses soy milk which is commonly used for the production of tofu or silken tofu and has a solid content of 5 to 12%. This soy milk usually has a pH value of 6.5 to 7.0. According to the invention, however, the pH value of the soy milk is adjusted to range between 5.6 and 6.2, preferably between 5.8 and 6.0, by the addition of suitable inorganic acid, organic acid or acid salt. More specifically, the pH adjustment is effected by adding acidifying agents authorized as food additives, such as acetic acid, citric acid, tartaric acid, fumaric acid, malic acid, glyconic acid, lactic acid, adipic acid, ascorbic acid, mono sodium fumarate, hydrochloric acid, phosphoric acid, disodium dihydrogen pyrophosphate and the like. The pH adjustment is conducted preferably at a temperature which is not higher than 45° C.

By way of reference, pressed tofu having a shape similar to ground meat and having a solid content of 44.2% was prepared without effecting the pH adjustment, i.e., by using the ordinary soy milk having a pH value of between 6.5 and 7.0, and was subjected to the measurement by the aforementioned texturometer after a packing in a casing, tieing off, heat treatment and cooling. This reference product showed a hardness of 1.9 Kg and a cohesiveness of 0.75 which well exceed the aforementioned values specified by JAS. In this case, however, there is a severe syneresis in the casing, as well as a contraction of gel. In addition, the hardness and chewiness are in-sufficient and the texture are far from those of the ground meat. Consequently, it proved that this reference material cannot be used practically as a substitute for the ground meat.

The soy milk having the thus adjusted pH value is coagulated to become a tofu as a result of coagulation effected by a coagulating agent such as calcium sulfate, calcium chloride and magnesium chloride. For shortening the coagulation time, it is preferred to use calcium chloride and magnesium chloride as the coagulating agent. The coagulating agent is added preferably at a ratio of 0.15 to 0.35% of the soy milk, and the coagulation is conducted at a temperature of between 70° and 90° C., preferably above 80° C.

The coagulated tofu is separated from whey by a suitable measure such as centrifuge, filtration, decantation and so forth. The thus prepared tofu is then dehydrated by a press such as an oil press until its solid content comes to range between 35 and 50%, preferably 42% or higher. In the event that the solid content is 35% or lower, the hardness and cohesiveness cannot exceed respective values of 2.0 Kg and 0.8 Kg. Namely, the hardness and the texture or chewiness are still unsatisfactory. On the other hand, it is quite difficult to dehydrate the tofu to a degree of 50% or higher in terms of solid content. For this reason, according to the invention, the solid content is limited to range between 35 and 50%.

The pressed tofu is shaped into a form like ground meat by means of, for example, a meat chopper. The shaped product preferably has a size of 2 to 5 mm which is selected according to the purpose or use of the product. The tofu shaped into the form of ground meat is then subjected to a heat treatment, for the purpose of developing a texture similar to that of ground meat, thereby imparting hardness and chewiness similar to those of the ground meat. The heat treatment can be effected by various methods. For instance, it is possible to heat-treat the shaped material in a steamer by a steam of 100° C. or hotter for 10 to 20 minutes. According to another method, the shaped material is put together with seasonings into hot water of a temperature of 80° C. or higher. According to still another method, the shaped material is packed in a casing together with seasonings and other additives, tied off and treated in hot water for a period of 20 to 60 minutes. It is even possible to fry the shaped material with oil in a frying pan.

The ground meat analog thus produced exhibits a faint taste and can be seasoned both for foods oriental or western style. This food, therefore, can be mixed with ground meats of beef, pork or chicken without imparing the flavour inherent in the meats. Thus, the food produced by the method of the invention can be used as a substitute for a part of ground meat as the material for a variety of foods which are cooked from ground meat.

The food produced by the method of the invention is fundamentally a pressed tofu, having a composition containing 54% of protein, 35% of lipid and 5.5% of ash, on an anhydride basis. As compared with commercially available textured soy protein having lipoid of 1% or lower, the food produced by the method of the invention advantageously has soybean oil containing 60% of essential fatty acid, as well as various elements such as vitamine E, sterols composed mainly of β-sitosterol having an cholesterol adsorption inhibitor, oil-soluble micro nutrients such as soybean lecithin and minerals such as calcium, magnesium and so forth. It is to be noted also that tofu suffers smaller possibility of generation of mutagens during the heat cooking as compared with meats, and effectively inactivates carcinogenic nitrosoamine, dimethylnitrosoamine, and so on. From this point of view, the food produced by the method of the invention well meets the current demand for health-giving foods.

Examples

Examples of the method of the invention are shown below. These examples, however, are only illustrative and not intended to restrict the scope of the invention.

Example 1

A 50% aqueous solution of lactic acid was added to 4 Kg of soy milk (solid content 8.2%, pH 6.8) at 40° C. to reduce the pH value to 6.0. Stirring and heating were continued and, when the mixture temperature was raised to 80° C., 10 g of calcium chloride was added in the form of 10% aqueous solution thus preparing a tofu. The tofu was then pressed by an oil press so that 510 g of pressed tofu having a solid content of 43.5% was obtained. This pressed tofu was shaped by a meat chopper into pieces similar to ground meat having a thickness of 3 mm. The pressed tofu, shaped into a form resembling ground meat, was packed into a casing of vinylidene chloride having a diameter of 5 cm, tied off, and heated for 30 minutes in boiling water and, after a cooling, maintained at 10° C. for one day. The hardness and cohesiveness of the product were measured by a texturometer and were found to be 3.4 Kg and 0.90, respectively. This product showed a satisfactory chewiness, without suffering from syneresis and contraction.

The pressed tofu chopped into pieces resembling ground meat was treated in a steamer by a steam of 100° C. for 30 minutes. A food resembling humburger was cooked using this treated tofu simulating ground meat together with the following meaterials. This food showed chewiness and hardness similar to those of humburger produced from ground meat of beef and pork.

| heat-treated tofu simulating ground meat | 100 parts |
|---|---|
| fresh chopped onion | 30 parts |
| bread crumb flakes | 15 parts |
| corn starch | 5 parts |
| white pepper | 0.35 part |
| whole egg | 30 parts |
| beef extract | 5 parts |
| table salt | 2 parts |
| water | 10 parts |

EXAMPLE 2

A 10% aqueous solution of citric acid was added to 7.5 Kg of soy milk (solid content 8.0%, pH 6.7) at 40° C. to reduce the pH value to 5.9. Stirring and heating were continued and, when the mixture temperature was raised to 85° C., 0.25% of natural "nigari" composed mainly of magnesium chloride was added in the form of 10% aqueous solution thus preparing a tofu. The tofu was then pressed by an oil press so that 1 Kg of pressed tofu having a solid content of 43.0% was obtained. This pressed tofu was shaped by a meat chopper into pieces similar to ground meat having a thickness of 3 mm. The pressed tofu, shaped into a form resembling ground meat, was subjected to a measurement by a texturometer in the same way as Example 1. The hardness and the cohesiveness were found to be 3.2 Kg and 0.88, respectively. This product showed a satisfactory chewiness, without suffering from syneresis and contraction.

A food resembling "soboro" (powdered meat) was cooked using this pressed tofu simulating ground meat together with the following materials, through seasoning, stirring and steam boiling. This food had a flavour resembling that of bonito, with a water content of 18.0%.

| pressed tofu simulating ground meat | 300 parts |
|---|---|
| soy sauce | 200 parts |
| sugar | 130 parts |
| "mirin" | 80 parts |
| sorbitol | 30 parts |
| bonito extract | 25 parts |
| red pepper | 2 parts |
| table salt | 2 parts |

EXAMPLE 3

A 10% aqueous solution of malic acid was added to 4.5 Kg of soy milk (solid content 7.8%, pH 6.6) at 40° C. to reduce the pH value to 6.0. Stirring and heating were continued and, when the mixture temperature was raised to 80° C., 110 g of calcium chloride was added in the form of 10% aqueous solution thus preparing a tofu. The tofu was then pressed by an oil press so that 710 g of pressed tofu having a solid content of 35.7% was obtained. This pressed tofu was shaped by a meat chopper into pieces similar to ground meat having a thickness of 3 mm. The pressed tofu, shaped into a form resembling ground meat, was subjected to a measurement by a texturometer in the same way as in Example 1. The hardness and the cohesiveness were found to be 2.1 Kg and 0.85, respectively. This product showed a satisfactory chewiness, without suffering from syneresis and contraction.

The pressed tofu chopped into pieces resembling ground meat was mixed with the following material in a depressurized kneader and the mixture was packed into a casing of vinylidene chloride of 5 cm diameter, tied off and heated for 40 minutes in boiling water. The food thus prepared exhibited a texture having a flavour resembling those of sausage.

| pressed tofu simulating ground meat | 100 parts |
|---|---|
| beef extract | 5 parts |
| salad oil | 5 parts |
| dextrine | 3 parts |
| pepper | 0.2 part |
| sage | 0.2 part |
| table salt | 2 parts |
| seasoning | 1 part |

What is claimed is:

1. A method for making a simulated ground meat analog from tofu obtained by coagulation of soy milk, said method comprising adjusting the pH value of soy milk to 5.6 to 6.2, coagulating the soy milk of adjusted pH to form tofu, pressing and dehydrating said tofu to a solid content between 35% and 50%, shaping the pressed, dehydrated tofu into a form analogous to ground meat, and heating the pressed, shaped tofu at a temperature and for a period of time sufficient to develop a texture similar to that of ground meat.

2. A method according to claim 1, wherein the pressed and dehydrated tofu has a hardness of 2.0 kg or higher, and a cohesiveness of 0.8 or higher.

3. A method according to claim 1, wherein the shaping is by chopping into a form analogous to ground meat.

4. A method according to claim 1, wherein the heating of the pressed, shaped tofu is at a temperature of 80° C. or higher.

5. A method according to claim 1, wherein the pH value is 5.8 to 6.0.

* * * * *